United States Patent [19]

Thorell et al.

[11] 4,114,921
[45] Sep. 19, 1978

[54] VEHICLE HITCH

[76] Inventors: Rook O. Thorell; Roger R. Ring, both of Loomis, Nebr. 68958

[21] Appl. No.: 725,588

[22] Filed: Sep. 22, 1976

[51] Int. Cl.² ............................................. B60D 7/00
[52] U.S. Cl. .................................. 280/478 B; 280/487
[58] Field of Search .............. 280/477, 478 R, 478 A, 280/478 B, 483, 486, 487

[56] References Cited

U.S. PATENT DOCUMENTS

| | | | |
|---|---|---|---|
| 1,422,189 | 7/1922 | Eckertz | 280/478 A |
| 3,397,900 | 8/1968 | Sturges | 280/478 R |
| 3,612,576 | 10/1971 | Marler | 280/478 B |
| 3,807,768 | 4/1974 | Jones | 280/478 B |

Primary Examiner—Kenneth H. Betts
Assistant Examiner—R. Schrecengost
Attorney, Agent, or Firm—Zarley, McKee, Thomte, Voorhees & Sease

[57] ABSTRACT

A hitch for use with the rear bumper of a truck or the like. The hitch includes a hollow diamond-shaped housing having a forward end, an open rearward end, top and bottom portions. A horizontally disposed tongue member has its forward end selectively movably received by the open rearward end of the housing and is selectively movable from a towing position to a hitching position. In the towing position, the tongue member has its forward end positioned adjacent the forward end of the housing. In the hitching position, the forward end of the tongue member is positioned towards the rearward end of the housing. The horizontal width of the housing intermediate its rearward and forward ends is greater than the width of the tongue member to permit horizontal swinging movement of the tongue member, relative to the housing, when the tongue member is in its hitching position. A spring-loaded pin extends downwardly through the rearward end of the housing and the tongue member to maintain the tongue member in its towing position. A plurality of longitudinally extending and horizontally spaced apart shafts are secured at their opposite ends to the top portion of the housing. A support is movably mounted on the shafts and a spring means mounted on the shafts yieldably resists relative movement between the shafts and the support. The support is rigidly secured to the bumper.

3 Claims, 6 Drawing Figures

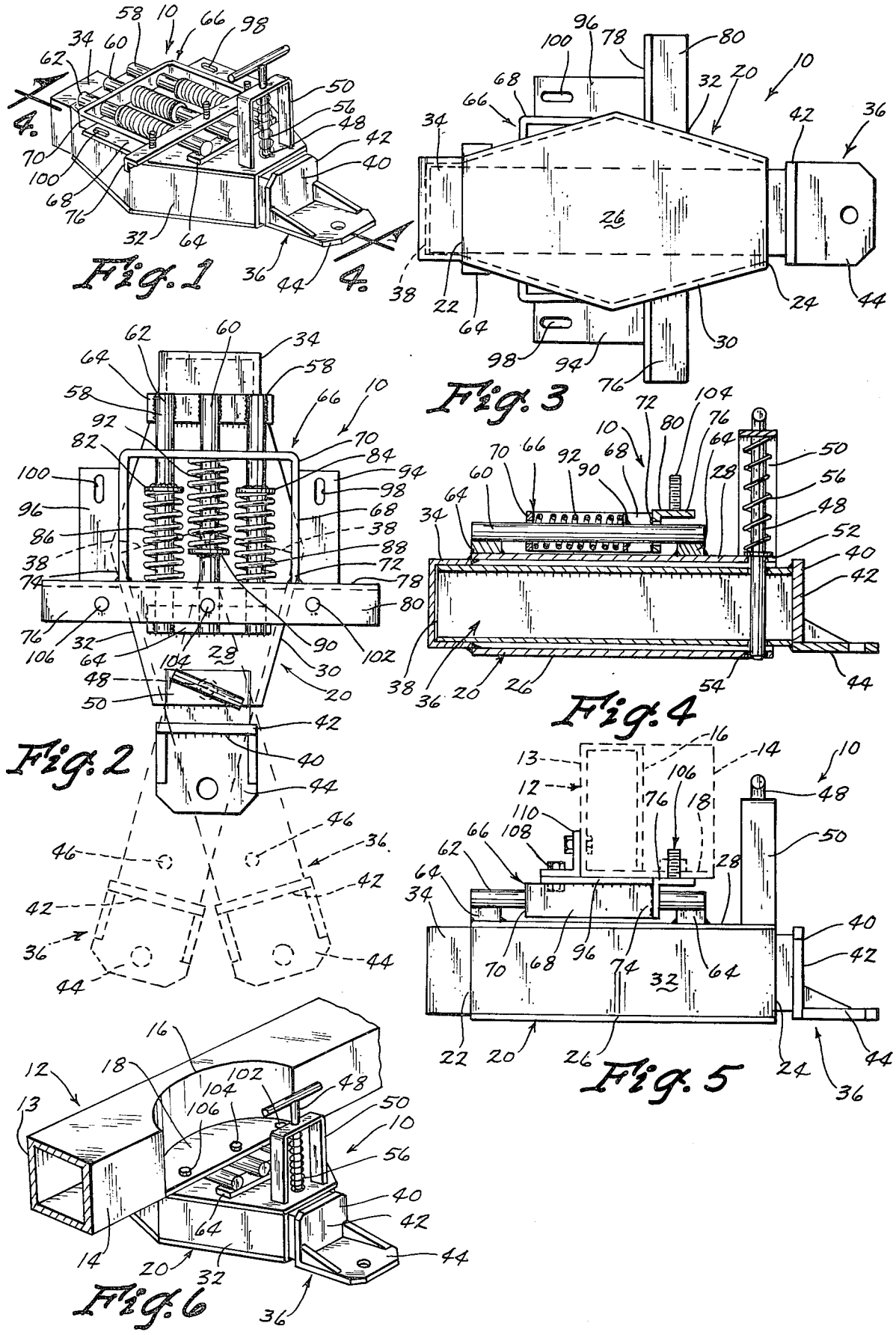

VEHICLE HITCH

BACKGROUND OF THE INVENTION

This invention relates to a vehicle hitch and more particularly to a vehicle hitch which includes a longitudinally movable and horizontally swingable tongue member as well as a shock absorber means.

Many types of vehicle hitches or coupling devices have been provided which eliminates the necessity of precise relative positioning of the vehicle and trailer or the like. Many of the coupling devices are difficult to use and are damaged during the coupling operation. Additionally, the trailing vehicle tends to transmit shock into the vehicle through the hitch which does frequently damage the hitch and the vehicle bumper itself.

Therefore, it is a principal object of the invention to provide an improved hitch.

A still further object of the invention is to provide a vehicle hitch including means for conveniently connecting a trailer or the like to a vehicle without the requirement of precise relative positioning of the vehicle.

A still further object of the invention is to provide a vehicle hitch including a shock absorber means associated therewith.

A still further object of the invention is to provide a vehicle hitch which is easily attached to existing bumpers without the necessity of extensively modifying the same.

A still further object of the invention is to provide a vehicle hitch which does not become clogged with mud, dirt or other debris.

A still further object of the invention is to provide a vehicle hitch which is durable in use and refined in appearance.

These and other objects will be apparent to those skilled in the art.

BRIEF DESCRIPTION OF THE DRAWINGS

FIG. 1 is a perspective view of the hitch of this invention:

FIG. 2 is a top view of the hitch:

FIG. 3 is a bottom view of the hitch:

FIG. 4 is a sectional view as seen on lines 4—4 of FIG. 1:

FIG. 5 is a side view of the hitch; and

FIG. 6 is a perspective view of the hitch installed on a vehicle.

DESCRIPTION OF THE PREFERRED EMBODIMENT

The hitch of this invention is referred to generally by the reference numeral 10 while the reference numeral 12 refers to a conventional bumper mounted on the rearward end of a vehicle such as a truck or the like. Bumper 12 includes a vertically disposed rearward end 14 which has an arcuate recessed area 16 formed therein to expose mounting plate 18 at the lower center portion thereof.

Hitch 10 generally comprises a hollow diamond-shaped housing 20 having a forward end 22, open rearward end 24, bottom 26, top 28 and opposite sides 30 and 32. As seen in the drawings, the side walls extend outwardly and rearwardly from the forward end and then terminate in an inwardly and rearwardly extending portion. Hollow tubular portion 34 is welded to the forward end of the housing 20 and communicates with the interior thereof. The forward end of the tubular portion 34 is closed by an end wall welded thereto.

The numeral 36 refers to a tongue member or draw bar having a forward end 38 and a rearward end 40. As seen in FIG. 4, plate 42 is welded to the rearward end of the tongue member 36 and has a plate 44 extending horizontally rearwardly from the lower end thereof. Tongue member 36 is provided with a vertically disposed opening 46 formed therein adapted to receive pin 48 as will be described in more detail hereinafter. Tongue member 36 is adapted to be received by the open rearward end 24 of housing 20 and is movable from the towing position illustrated by solid lines in FIG. 2 to the hitching position illustrated by broken lines in FIG. 2. When in its towing position, the forward end 38 of tongue member 36 is received in the interior of tubular member 34 which prevents swinging movement of the tongue member relative to the housing.

A U-shaped support 50 is welded at its lower ends to the top portion of the rearward end of housing 20. Pin 48 is vertically movably mounted in the support 50 and is yieldably forced downwardly through registering openings 52 and 54 formed in the top and bottom portions of housing 20 respectively by means of a spring 56.

Shafts 58, 60 and 62 are positioned above top portion 28 of housing 20 and have their opposite ends welded to spacers 64 which are welded to the top portion 28 of housng 20 so that shafts 58, 60 and 62 are spaced above the housing 20. The numeral 66 refers to a support which is movably mounted on the shafts 58, 60 and 62. Support 66 is comprised of a U-shaped member 68 having a forward end 70 and rearwardly extending sides 72 and 74. Forward end 70 is provided with openings formed therein which movably receive the shafts 58, 60 and 62. The rearward ends of sides 72 and 74 are welded to a transversely extending angle 76 comprised of a forward wall 78 and a top wall 80. Forward wall 78 is also provided with openings formed therein which removably receive the rearward ends of the shafts 58, 60 and 62. Shafts 58 and 62 are provided with washers 84 and 82 mounted thereon and secured thereto by welding or the like. Coil spring 88 embraces shaft 58 between washer 82 and forward wall 78 of angle 76. Coil spring 86 embraces shaft 62 between washer 84 and forward wall 78 of angle 76. Washer 90 is secured to shaft 60 by welding and it can be seen that a coil spring 92 embraces shaft 60 between washer 90 and the forward portion 70 of U-shaped member 68. Thus, springs 86 and 88 yieldably resist the rearward movement of support 66 relative to the shafts 58, 60 and 62 and the housing 20 while spring 92 yieldably resists the forward movement of the support 66 relative to the shafts 58, 60 and 62 and the housing 20. Plates 94 and 96 are welded to the outer surfaces of sides 72 and 74 and the forward wall of angle 76 as seen in the drawings and are provided with longitudinally extending slots 98 and 100 formed therein respectively.

The hitch is secured to the bumper 12 by means of bolt assemblies 102, 104 and 106 extending through top wall 80 and mounting plate 18. Bolts 108 and 110 (not shown) extend through plates 96 and 94 respectively and are secured to angle clips 110 and 112 (not shown) respectively which are secured to the forward wall 13 of bumper 12 by bolts.

The hitch is secured to the bumper as previously described and would normally be in the towing position illustrated in FIG. 6. When it is desired to connect a trailer or the like to the hitch, the vehicle would normally be backed rearwardly adjacent the vicinity of the forward end of the trailer tongue. Pin 48 is then moved upwardly relative to the tongue member 36 so that the tongue may be moved to the position illustrated by broken lines in FIG. 2. In the position illustrated by broken lines, the tongue member 36 may be swung from side to side, rearwardly or forwardly to facilitate the connection of the hitch to the trailer tongue. The diamond shape of the housing 20 permits the tongue member 36 to be swung from side to side. When the connection has been made, the vehicle is backed rearwardly which causes the tongue member 36 to move forwardly relative to the housing 20. The configuration of the side walls guides the forward end of the tongue member into the interior of the tubular portion 34. As soon as the lower end of pin 48 registers with the opening 46, spring 56 causes the pin to move downwardly so that the tongue member 36 is rigidly maintained in the towing position. The springs 86, 88 and 92 provide the shock absorber action during the towing operation as previously described.

The open upper end of the U-shaped support 66 is quite important in that rocks and debris do not tend to accumulate therein as is the case when the springs are mounted in a totally enclosed compartment. If desired, the tongue member 36 may be completely withdrawn from the housing 20 and rotated 180° so that the plate 44 is positioned adjacent the upper end of the tongue member rather than the lower portion of the tongue member to accommodate different bumper heights.

Thus it can be seen that a novel hitch has been provided which includes means for conveniently connecting a trailer or the like to a vehicle without the requirement of precise relative positioning thereof and which includes a shock absorber means associated therewith. It can also be seen that the configuration of the housing 20 not only permits the swinging movement of the tongue member during the hitching operation but also provides means for re-positioning the tongue member in the towing position. Thus it can be seen that the hitch accomplishes at least all of its stated objectives.

I claim:

1. In combination with a vehicle bumper having rearward and forward ends, and a bottom portion,
   a horizontally disposed hollow housing having a forward end, an open rearward end, top and bottom portions,
   a horizontally disposed tongue member having rearward and forward end, said tongue member having a quadrilateral cross-section,
   said tongue member having its forward end selectively movable received by the open rearward end of said housing and being selectively movable from a towing position, wherein the forward end of said tongue member is positioned adjacent the forward end of said housing, to a hitching position wherein the forward end of said tongue member is positioned rearwardly of the forward end of said housing,
   said housing having a horizontal width intermediate its rearward and forward end which is greater than the width of said tongue member to permit the horizontal swinging movement of said tongue member, relative to said housing, when in its hitching position,
   means for selectively maintaining said tongue member in said towing position,
   a first support rigidly secured to the top portion of said housing and having rearward and forward ends,
   a second support longitudinally movably mounted on said first support between said rearward and forward ends,
   a spring means interconnecting said first and second supports for yieldably resisting the relative longitudinal movement of said first and second supports,
   and means for securing said second support to said bumper,
   said housing having a pair of spaced-apart rear side wall portions extending forwardly and outwardly from its open rearward end,
   said housing having a pair of spaced-apart forward side wall portions extending forwardly and inwardly from the forward ends of said rear side wall portions,
   and a hollow tubular member extending forwardly from the forward ends of said forward side wall portion for receiving the forward end of said tongue member when said tongue member is in its hitching postition,
   said hollow tubular member having a quadrilateral cross-section for closely embracing said forward end of said tongue member to prevent lateral swinging of said tongue member when said tongue member is positioned within said hollow tubular member.

2. The combination of claim 1 wherein said first support comprises a plurality of longitudinally extending and spaced-apart rods secured to the top portion of said housing, said second support being movably mounted on said rods, said spring means being positioned on said rods for engagement with said second support.

3. The combination of claim 1 wherein said second support is secured to the bottom portion and the forward end of said bumper.

* * * * *